United States Patent
Chandra et al.

(10) Patent No.: US 7,397,779 B2
(45) Date of Patent: Jul. 8, 2008

(54) MINIMIZING HANDOFFS AND HANDOFF TIMES IN WIRELESS LOCAL AREA NETWORKS

(75) Inventors: Praphul Chandra, Germantown, MD (US); Manoj Sindhwani, Oak Hill, VA (US); David Lide, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 623 days.

(21) Appl. No.: 10/951,974

(22) Filed: Sep. 28, 2004

(65) Prior Publication Data

US 2006/0072507 A1  Apr. 6, 2006

(51) Int. Cl.
*H04Q 7/00* (2006.01)
(52) U.S. Cl. .................. 370/332; 370/331; 455/436
(58) Field of Classification Search .............. 370/331, 370/332, 329, 392, 401; 455/436–439, 435.2
See application file for complete search history.

(56) References Cited

U.S. PATENT DOCUMENTS

| | | | |
|---|---|---|---|
| 6,982,949 B2 * | 1/2006 | Guo et al. ............. | 370/210 |
| 7,146,130 B2 * | 12/2006 | Hsu et al. ............. | 455/3.04 |
| 2002/0141375 A1 * | 10/2002 | Choi ..................... | 370/347 |
| 2004/0114553 A1 * | 6/2004 | Jiang et al. ........... | 370/328 |
| 2005/0117524 A1 * | 6/2005 | Lee et al. ............. | 370/254 |
| 2005/0237963 A1 * | 10/2005 | Storm .................. | 370/320 |
| 2007/0171869 A1 * | 7/2007 | Salkintzis ............. | 370/331 |

OTHER PUBLICATIONS

Sachin Gar et al, "On the Throughput of 802.11b Networks for VoIP", Mar. 13, 2002, pp. 1-13.
Arunesh Mishra et al, "An Empirical Analysis of the IEEE 802.11 MAC Layer Handoff Process" (8 pages).

* cited by examiner

*Primary Examiner*—Cong Van Tran
(74) *Attorney, Agent, or Firm*—Steven A. Shaw; W. James Brady; Frederick J. Telecky, Jr.

(57) ABSTRACT

A method for reducing the number of channels that are scanned during a handoff situation for a wireless endpoint station in a wireless local area network (WLAN), such as an IEEE 802.11 network, by tracking past user movements within the WLAN. A suitable sequence of channels to be scanned is generated so that reduce the number of handoffs are reduced and the average time during a handoff is reduced. To reduce handoffs and handoff latencies, the principle of locality (user movement patterns tend to be repetitive) is used. By tracking the past handoffs, future handoffs are predicted.

14 Claims, 4 Drawing Sheets

MINIMIZING HANDOFFS AND HANDOFF TIMES IN WIRELESS LOCAL AREA NETWORKS

CROSS-REFERENCE TO RELATED APPLICATIONS

None

FIELD OF THE INVENTION

The present invention relates generally to transmitting voice data over a wireless local area network (WLAN). More specifically, the present invention relates to reducing handoff time and the number of handoffs when a wireless endpoint station moves around an Extended Service Set (ESS).

BACKGROUND OF THE INVENTION

WLANs (Wireless Local Area Networks) utilize RF (Radio Frequency) signals or light signals to connect mobile endpoints to each other or to a centralized gateway and transmit data over a wireless medium between the physical endpoints or between a mobile endpoint and an endpoint on a network that is connected to the WLAN. In 1997 the IEEE published standards for WLANs under the title of 802.11 (also known as "Wi-Fi"). The IEEE 802.11b protocol has gained popularity over the past few years and deployment of 802.11b networks is expected to increase significantly in the near future. Currently, most of these networks are used for data access from laptop computers and personal digital assistants (PDAs). The basic hardware setup of an IEEE 802.11 network is the Basic Service Set (BSS), which is merely a number of endpoint stations that communicate with one another. And ESS is larger than a BSS and can be a combination of BSSs or a BSS and other associated network nodes, components, and LAN lines. Using a WLAN to place voice phone calls using VoIP (Voice over Internet Protocols) over WLAN is also expected to grow significantly in the near future. However, VoIP over WLAN presents a unique set of problems that must be addressed prior implementing this technology.

There exists a plurality of 802.11 standards that each use different frequency bands and have varying data transmission speeds. The original IEEE 802.11 standard supported wireless interfaces operating at speeds of up to 2 megabyte per second (Mbps) in the 2.4 GHz radio band. By using different modulation techniques, IEEE 802.11b raised the data transmission rates to 11 Mbps, while 802.11a supports up to 54 Mbps transmission rates at a 5 GHz frequency. The IEEE 802.11 µg is developing a standard for data transmission rates of 54 Mbps at the 2.4 GHz frequency.

WLANs under 802.11 use media access control (MAC) protocols to transmit between wired and wireless devices. Each wireless network card is assigned a MAC address used to identify the station. In a BSS, IEEE 802.11 enables wireless mobile stations (STAs) to communicate through a wireless network interface directly with each other or with other stations through an access point. An access point (AP) is a centralized gateway providing message and power management and access to an external LAN (Local Area Network) and/or the Internet.

The access to wireless networks is controlled by coordination functions. The distributed coordination function (DCF) provides access similar to Ethernet CSMA/CA access. The DCF determines if the RF link between devices is clear prior to transmitting. Stations use a random backoff after every frame to avoid collisions. Endpoint stations provide MAC Service Data Units (MSDUs) after detecting no current transmissions. The MSDUs functions to transmit data frames to the proper endpoint station.

FIG. 1 illustrates a schematic diagram of an exemplary WLAN enterprise network under IEEE 802.11 protocols. One basic service set (BSS) has a wireless access point (AP1) 12 and a second BSS has a wireless access point (AP2) 14. An AP acts as a bridge for data with wireless STAs that are associated with that AP. An enterprise network typically has multiple BSSs and multiple APs distributed throughout an office complex or among floors on buildings so that a STA may be operated from nearly anywhere in a complex or building. Each AP in a BSS has an RF propagation broadcast area that has an effective range based upon broadcast power, natural signal attenuation, and interferences. AP1 12 has an RF propagation area defined exemplarily by coverage ring 13, and AP2 14 has an RF propagation area defined exemplarily by coverage ring 15. A WLAN may also be used to send voice data signals using a WIPP (Wireless Internet Protocol Phone or IP Phone) 16 that transmits data signals using voice protocols, such as voice over Internet Protocol (VoIP). Notebook computer 18 is associated with AP1 12 using a wireless network interface card and transmits data using IEEE 802.11 protocols. Both APs 12, 14 are connected to an internal corporate Intranet 20. The Internet 26 may be accessed through intranet 20 and gateway 22 or alternatively through AP1 12 through a Radius authentication server 24.

Referring to FIG. 2, a user carrying WIPP 16 that is associated with AP2 14 may want to walk into an area near AP1 using traverse path 40. If AP1 and AP2 are part of the same BSS or WLAN, a "handoff" occurs when WIPP 16' enters AP1's coverage area 13, ends association with AP2, and associates with AP1. Thus, when the WIPP 16 enters area 13, the association of wireless data transfer from WIPP 16 moves from AP2 to AP1. At least two APs are always involved in a handoff. The AP that the STA is moving away from is called the prior-AP (here AP2) and the AP the STA moving towards is called the posterior-AP (here AP1). A handoff process permits a user to move a STA around a large WLAN containing multiple BSSs, and hence multiple APs, while continuing to seamlessly use the STA without dropping its connection to the WLAN.

A problem with handoffs, however, occurs with latency during the handoff process. The probing delay is the dominating component in handoff times. Studies, such as *An Empirical Analysis of the IEEE 802.11 MAC Layer Handoff Process* (Mishra, Shin, and Arbaugh, University of Maryland, College Park, Md.) have shown that over 90% of the delay time during a handoff is consumed by the probing process. During this latency period the STA cannot transmit or receive data. This is especially a concern for a WIPP 16 that sends and receives phone calls over the WLAN. Typical handoff latency is of the order of 100-300 msec (milliseconds). The probing process during a handoff causes a STA to probe all channels to search for a suitable AP with which to connect. An exemplary STA driver may scan all possible channels sequentially starting from zero. This delay becomes especially relevant for real-time applications like voice and video over WLAN.

Handoff delay can be explained by analyzing the default handoff procedure of a STA. Once a STA determines that it needs to do a handoff, it would typically scan all channels for finding an AP to connect to and then connect to the most "suitable" one among the available choices. There are two problems with this approach. First, scanning all channels every time a handoff is needed consumes a considerable amount of time. Second, the "suitable AP selection" is usually chosen due to the signal strength, i.e. if the SSIDs, security settings, etc. are similar, than an AP with the highest signal strength would be selected. Selecting an AP simply because it has the highest signal strength will not always yield expected results for seamless networking, since ESSs are usually designed with a bit of overlap to provide uninterrupted connectivity. This overlap means that AP1 may be better than AP2 in an overlapping region but outside this overlap, each one would dominate its own coverage area.

SUMMARY

The above problems identified with the prior art are overcome with a technique for reducing the number of channels that are scanned during a handoff situation by tracking past user movements to select the posterior AP. A suitable sequence of channels to be scanned is generated in a memory table so that the number of handoffs are reduced and the average time during a handoff is reduced. To reduce handoffs and handoff latencies, the principle of locality (user movement patterns tend to be repetitive) is used. By tracking the past handoffs, future handoffs are predicted.

Two special cases are addresses in the technique for reducing handoff times. The first case is for coping with changes in user-movement patterns over time. A technique to predict the probability of a future handoff is enhanced by limiting the importance given to any one AP. Further, the technique is enhanced to compensate for additions of new APs or the removal of existing APs.

An alternative embodiment reduces the number of handoffs that occurs for a STA in an 802.11 WLAN. In this embodiment, each STA keeps a record of the time it has spent (e.g., "TS") in association with the last three APs that it has been connected to. When the STA is about to perform a handoff from STA compares the saved values of time spent from the potential APs for a handoff. If one of the APs has a low time spent value, that is a transitional AP and the STA could probably have switched from the prior AP to the posterior AP directly, thus saving a handoff.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

The preferred embodiment of the present invention includes a technique for reducing the handoff times to prevent delay in packet transmissions on a wireless local area network (WLAN) and reducing the number of handoffs wire a wireless endpoint station (STA) between access points (APs). One implementation of the preferred embodiment is on an IEEE (Institute of Electronic and Electrical Engineers) 802.11 WLAN. An 802.11b WLAN network is a highly dynamic environment because of the inherent dynamics of the wireless medium, low operating power of 802.11, and operation in the 2.4 GHz range. Since the 802.11b operates at low power (to save power and increase battery lifetimes), a geographically smaller BSS with multiple APs (Access Points) leads to frequent handoffs and roaming scenarios. Further, since 802.11b networks operate in the unlicenced frequency range of 2.4 GHz, it is potentially open to interference from other devices (e.g., microwaves, cordless phones, Bluetooth WLANs). The two major 802.11 QoS (Quality of Service) standards include the WME and the 802.11e.

Figure 1:
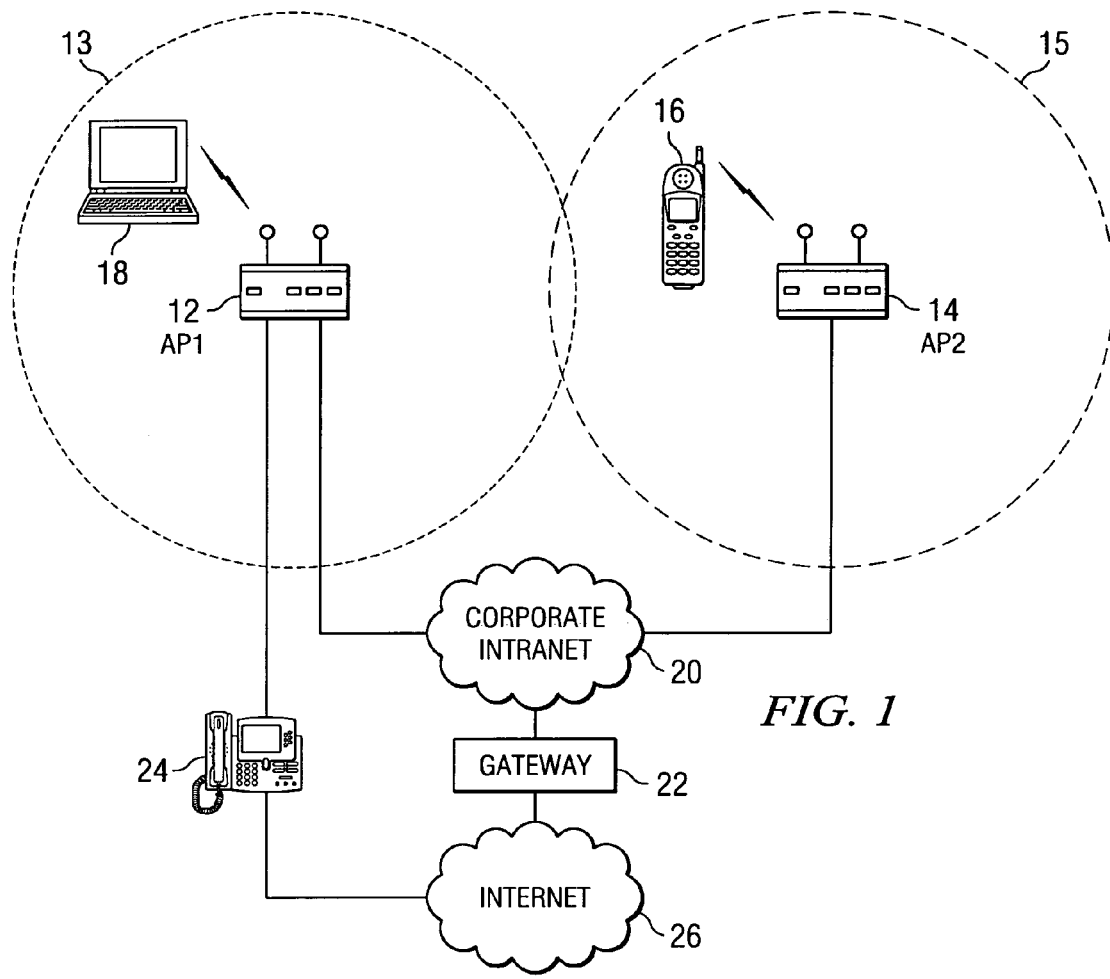
FIG. 1 illustrates an enterprise wireless local area network.
Figure 2:
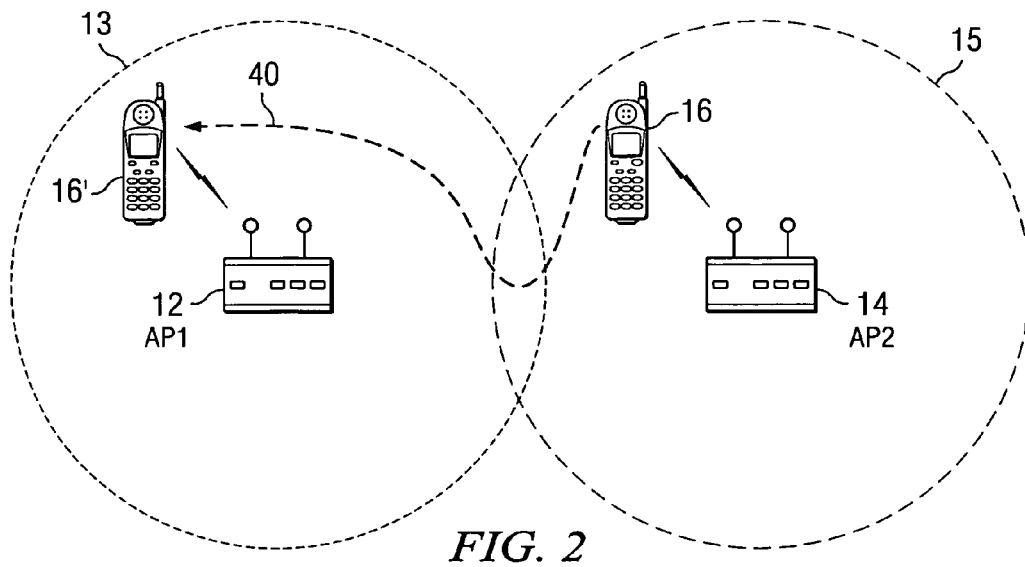
FIG. 2 illustrates a wireless station moving between two access points.

As stated above, FIG. 2 illustrates a diagram of the enterprise WLAN network of FIG. 1 with WIPP (Wireless Internet Protocol Phone or IP Phone) 16 moving from the RF coverage area 15 for AP2 14 into RF coverage area 13 of AP1 12 along traverse 40. WIPP 16 can "roam" between AP1 12 and AP2 14, allowing a user of the WIPP to move within the network coverage areas 13 and 15 without dropping its signal. While "roaming" is defined as the ability for a cellular phone customer to automatically make and receive calls when the cellular handset has geographically moved outside of a service provider's home network coverage area and use an alternate network operated by a different service provider, "roaming" between APs refers to a same concept to move WIPP 16 between different APs in the same ESS. Enterprise-wide mobility allows affordable mobile connectivity to a large population of employees and can provide enterprise IP-PBX (IP Private Branch Exchange) features on a mobile phone such as voice mail, conferencing, transfer, and extension dialing.

Figure 3:
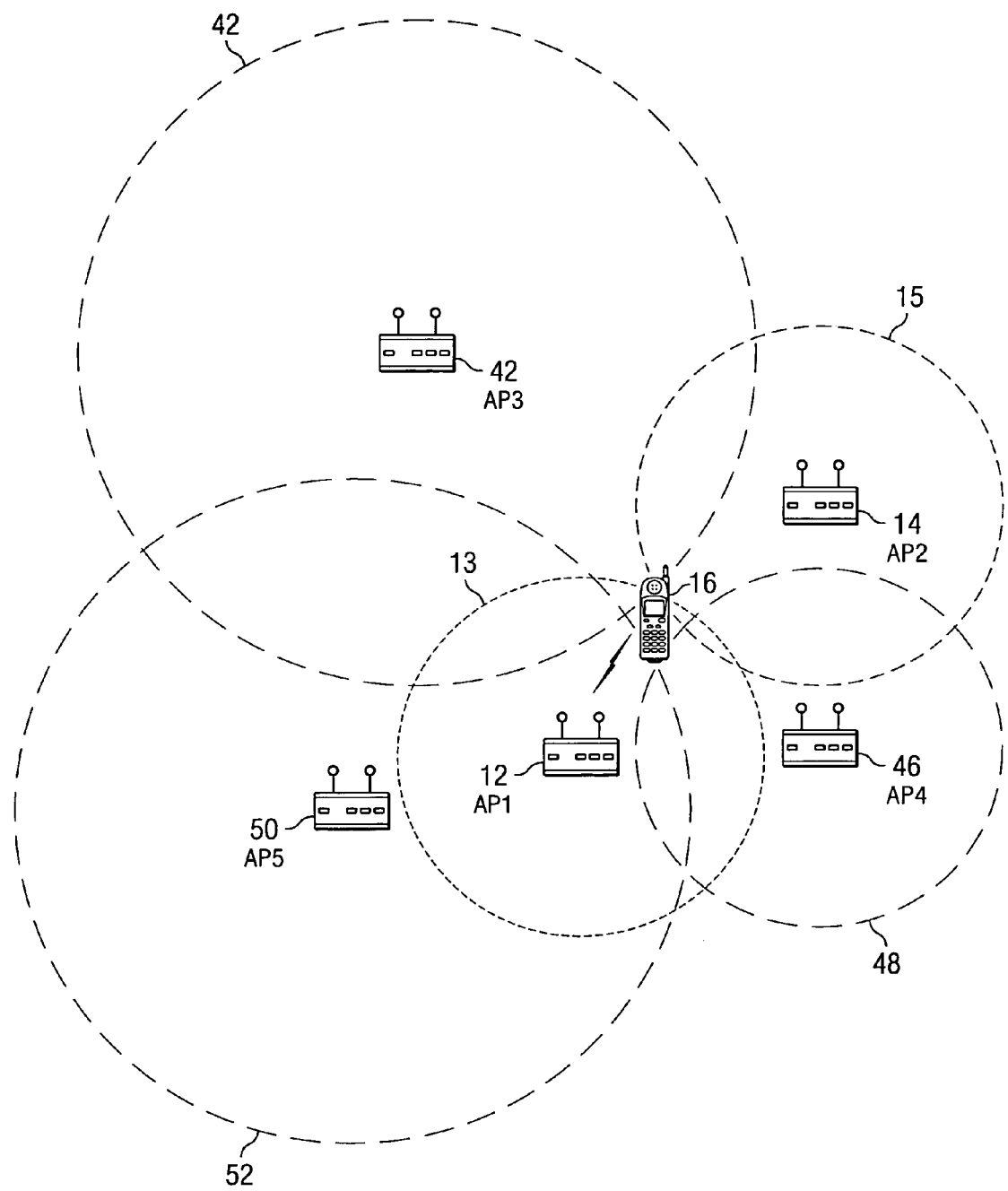
FIG. 3 illustrates an access point with neighboring access points.

In the preferred embodiment, the concept of a domain is defined as a set of neighboring APs. A domain would typically refer to a subset of APs constituting an ESS (Extended Service Set). FIG. 3 illustrates a diagram of a domain in a WLAN. The exemplary WLAN is an IEEE 802.11 WLAN network that typically is used by a large commercial or retail space, industrial complex, academic facility, hospital, etc. Instead of two APs as shown in FIG. 2, the WLAN in FIG. 3 has five APs. AP3 42 has an RF signal propagation area defined by coverage ring 44, AP4 46 has RF signal propagation area defined by coverage ring 48, and AP5 50 has RF signal propagation area defined by coverage ring 52. WIPP 16 is located in an area where all five signal propagation areas somewhat overlap, meaning a STA at WIPP's 16 location can detect signals from all five APs shown in FIG. 3.

In the preferred embodiment, a STA of interest maintains a Site History Table for each of a set of profiles in memory. The Site History Table begins with no entries but has spaces slotted for BSSIDs (Basic Service Set Identifications) of multiple APs and a running count of detections of the same BSSIDs. A BSSID is a 48-bit identifier used by all APs in a BSS that distinguishes one distinct BSS from another.

Figure 4:
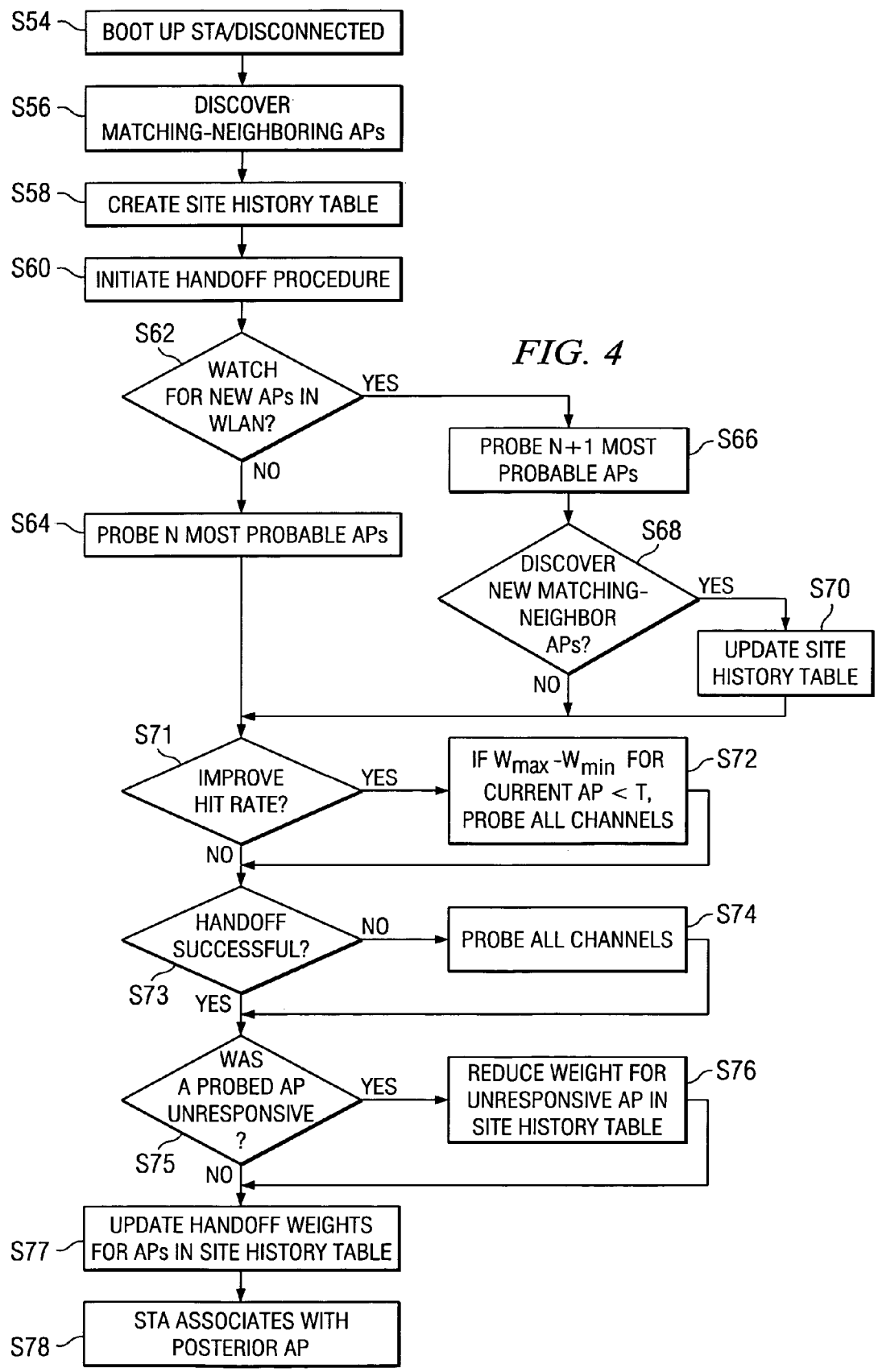
FIG. 4 illustrates a flowchart of the preferred embodiment for minimizing handoffs and handoff times in a wireless local area network.

Referring to the flowchart of FIG. 4 to illustrated the method of the preferred embodiment, when a STA (e.g., WIPP 16) boots up for the first time S54, it connects to AP1 and determines S54 that it has matching-neighboring APs: AP2, AP3 and AP4. Matching-Neighboring APs refers to APs any one of which the STA could have connected to given its current profile. In other words, this means that AP1 was selected over the other APs because of its signal strength. Using this information WIPP 16 initializes a Site History Table S58 as follows:

|     | AP1 | AP2 | AP3 | AP4 |
| --- | --- | --- | --- | --- |
| AP1 | X   | 0   | 0   | 0   |
| AP2 | 0   | X   | 0   | 0   |
| AP3 | 0   | 0   | X   | 0   |
| AP4 | 0   | 0   | 0   | X   |

Each entry in the Site History Table represents a weight, W. $W_{i,j}$ refers to the weight in row-i and column-j. Now, STA 16 determines that it needs to start a handoff procedure S60. At this time, STA 16 reads through the AP1-row in the Site History Table. Since all values in this row are currently zero, the STA 16 scans all channels sequentially. If the STA 16 finds any new Matching-Neighboring APs during the scans, it updates its Site History table by adding these new APs. For example, during subsequent scans STA 16 finds one new matching-neighboring AP, which is AP5. Then STA 16 would update its Site History table by adding a row and column for AP5 as follows:

|     | AP1 | AP2 | AP3 | AP4 | AP5 |
| --- | --- | --- | --- | --- | --- |
| AP1 | X   | 0   | 0   | 0   | 0   |
| AP2 | 0   | X   | 0   | 0   | 0   |
| AP3 | 0   | 0   | X   | 0   | 0   |
| AP4 | 0   | 0   | 0   | X   | 0   |
| AP5 | 0   | 0   | 0   | 0   | X   |

Note that the value of each entry in the AP5-column is initialized to the maximum value in each corresponding row whereas the value of AP5-row is all initialized to 0. In this case the STA 16 has just detected AP5 and the AP5-column entries are all zero. However, as shown below this value will increase with subsequent detections of the AP. Once the scanning is complete, the STA 16 has a list of all possible APs with which it can connect, the Site History Table updates, and the STA parses the row of its prior-AP. In this case, AP1-row is all zeros, so the STA selects the posterior-AP based on the signal strength, which is the default behavior. Note that up until now, the STA 16 has followed the standard 802.11 procedure for detecting APs. Using the preferred embodiment, however, STA 16 has created and updated a Site History Table of detections.

Next, STA 16 selects AP3 as the posterior-AP and connects to it successfully S64. STA 16 updates its Site History table to have $W_{1,3}=1$. This denotes that the STA moved from AP1 to AP3 once in its lifetime. As the STA continues to roam between prior and posterior-APs, the Site History table is updated according to the procedure explained above. After a period of time of detecting additional APs and updating the Site History Table, a typical Site History Table would resemble the following:

|     | AP1 | AP2 | AP3 | AP4 | AP5 | AP6 | AP7 |
| --- | --- | --- | --- | --- | --- | --- | --- |
| AP1 | X   | 0   | 6   | 0   | 2   | 8   | 0   |
| AP2 | 0   | X   | 0   | 0   | 0   | 0   | 12  |
| AP3 | 0   | 4   | X   | 0   | 18  | 0   | 0   |
| AP4 | 0   | 0   | 0   | X   | 0   | 0   | 0   |
| AP5 | 0   | 0   | 0   | 0   | X   | 3   | 0   |
| AP6 | 3   | 3   | 4   | 0   | 7   | X   | 5   |
| AP7 | 2   | 18  | 4   | 0   | 1   | 5   | X   |

As is shown in the table above, AP6 and AP7 (not shown) were added after detection by STA 16. Analyzing the above table, if the STA 16 is in AP2's coverage area 15, there is a very high probability that when STA 16 performs a handoff procedure, it will handoff to AP7. This is because when a user with WIPP 16 moves from AP2's coverage area the user most frequently has entered AP7's coverage area (not shown) (scanning column for AP2 to intersect with row for AP7 shows 12 times in the table, so $W_{2,7}=12$). Similarly, if the STA is in AP3's coverage area 44, it will probably handoff to AP5 because $W_{3,5}=18$. The table also shows that when the STA 16 is in AP7's coverage area, it will probably hand off to AP2 ($W_{7,2}=18$). To exploit this user movement pattern, when the STA 16 starts its handoff procedure, it should send probe requests to only to the N most probable APs based on the Site History Table S64.

This is basically a caching technique where the past user movement and at the time of handoff is cached, and this cached history is used to attempt connection to the N most probable posterior APs. A cache-hit is defined as a successful connection to one of these N APs and reduces handoff time by reducing the number of probes needed to N. In other words, if a handoff S73 is successful the user's STA will associate with the posterior-AP S78. However, a cache miss is defined as an unsuccessful probe attempt to connect to these N APs. This case should be handled by resorting to a complete scan of all channels (the default behavior) S74 and leads to an additional delay of the order of the N probes that were 'wasted' attempting to use the cache. As with any caching scheme, the success depends on the hit-rate, i.e. how often does a user repeat his or her past movement with STA 16.

In the preferred embodiment the following technique is used to improve the hit-rate. First, The value of N should serve not as an absolute but as a maximum guideline. For example, if N equals 3, this does not mean three APs must be scanned for every handoff. This should mean a maximum of up to three APs are scanned. For example, in the Site History Table above a. a STA in AP1 should probe only for AP6, AP3 and AP5;
b. a STA in AP2 should probe for AP7 only;
c. a STA in AP3 should probe for AP2 and AP5;
d. a STA in AP4 should probe all channels (default);
e. a STA in AP5 should probe for AP6 only;
f. a STA in AP6 should probe for AP5, AP7 and AP3;
g. a STA in AP7 should probe for AP2, AP6 and AP3.

Second, to improve the hit-rate S71, use N=0 (i.e. resort to default behavior of scanning all channels) if $W_{max}-W_{min}$ for the current AP is less than some threshold T (S72). This rule handles the case where either a clear user-movement pattern has not been determined through the Site History Table or there is inadequate information about handoffs initiated in the current AP to use the past performance as an indicator of future behavior. Using this rule with T=5 with the rules above, the above example probe results remain the same except for the result for AP6 and AP5. In the case of AP6, since $W_{max}-W_{min}=4$, all channels are scanned for a handoff procedure since there is no clear pattern of user movement out of AP6's coverage area. In the case of AP5, $W_{max}-W_{min}$ is 3 since there is not enough information in the table to deduce a user movement pattern.

It is understood that the selections of values for N and T are engineering trade-offs and can vary from typical values. However in the preferred embodiment typical values for N would be 2-4 and typical values of T would be 8-12. The lower the value of N, the lower the handoff delay if the user is in fact repeating her previous movement pattern. If, on the other hand, this movement is a deviation, these first N probes would fail. In case of this failure, the STA 16 should return to its default behavior of scanning all channels sequentially, thus leading to an additional handoff delay of N probes. Quantitatively, the Average Probe Time would be given as:

$$PT_{avg} = (R*PT_N) + (1-R)*(PT_{n+x}) + x$$

where R is the hit-rate, x is the number of channels, and $PT_j$ is the time taken for j probes. As should be expected, the performance of the preferred embodiment for minimizing handoff times would improve as the Site History Table builds up (e.g., R increases). The value of T is the threshold of establishing a pattern in user movement. Lower values of T would benefit users who tend to repeat established patterns of movement, and higher values of T would benefit users whose pattern is more random in nature.

An exemplary embodiment of the present invention handles changes in user-movement patterns over time. To handle these scenarios, whenever the Site History table is updated, the STA should carefully track updates so that if the weight being updated is W1 and if the next highest weight in this row is W2, then (W1+1)−W2<=T. If this is not the case, W1 should not be updated/incremented and should remain its original weight. This embodiment ensures that no AP becomes "too important."

In the above scenario, no history of user movements are lost since W1 continues to be much more important than W2. However, this ensures that if the user movement-pattern changes drastically, the new pattern would be able to overwrite the old pattern within a reasonable time. The worst case value for this time is the C*T handoffs, i.e. the STA would have to C*T handoffs in the new pattern before it can start taking advantage of reduced handoff times. This is advantageous for a number of reasons. First, C would be a small number (e.g. 3 to 5) in well designed networks and second, the worst-case scenario will not be reached unless the network topology is changed drastically. It is more reasonable to expect that the time for a "user-movement-profile change" would be of the order of (1 to 2)*T handoffs.

An additional embodiment handles network topology change due to the addition of a new AP S62. To solve this problem, $N_{\mathit{eff}}$ is defined as $N_{\mathit{eff}} = N+1$. Therefore, at every handoff STA 16 scans not only the N channels with the highest weights but also one additional channel S66. This additional channel number is varied from channel 0 to channel 14. Thus, the first handoff would scan the N highest weight channels plus channel 0, the second handoff would scan the N highest channels plus channel 1, and so on. This technique would ensure that any new AP S68 introduced in the WLAN is added to the Site History Table S70. Combined with the fact that when a new AP is added to the table each entry in the APnew-column is initialized to the maximum value in each corresponding row whereas the values of APnew-row are all initialized to 0, this rule will result in placing the APnew on equal footing with the most preferred AP for all neighboring APs. In other words, this would give the STA a chance to use this new AP. If the new AP is not used or used infrequently, then its weight in the Site History Table would soon be overtaken by the weighs given to other APs.

A further embodiment addresses network topology change due to the removal of an AP in a WLAN. To solve this problem, whenever a STA sends out a probe request to an AP and does not receive back a probe response S75, the STA decreases the corresponding weighted entry for the AP (S76), such as decreasing each weight by 1. In effect, this would age-out the old APs from the Site History Table so that eventually if an AP was never detected after numerous attempts, the missing AP's weight number would fall to zero.

A further embodiment of the present invention for reducing handoff times relates to using either recent used APs or least frequently used APs in a Site History Table to derive subsequent probable handoffs. In the preferred embodiment using the Site History Table, the STA uses N most probable posterior-APs to determine a probable handoff. This can be obtained by looking at the N most frequently used (e.g, most frequently "switched-to") APs in the Site History Table. In effect, the caching technique uses a Most-Frequently-Used algorithm to predict the next AP. However, the technique of the preferred embodiment can be modified to use a Most-Recently-Used algorithm or a Least-Recently-Used or a Least-Frequently-Used algorithm if the user patterns (or the network set-up) so dictates. Furthermore, it is possible to device algorithms which uses an algorithm which considers a weighted average of these measures to decide the next N most probable APs.

Figure 5:
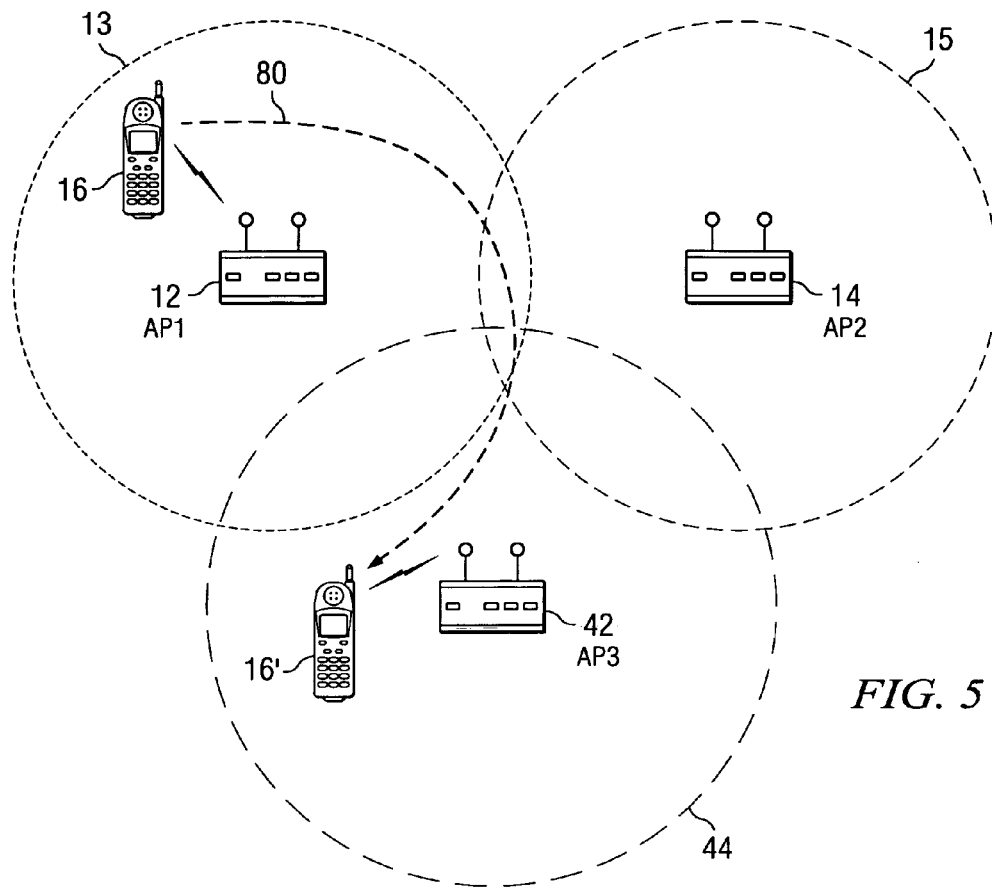
FIG. 5 illustrates a wireless station traveling through RF coverage areas of three access points.
Figure 6:
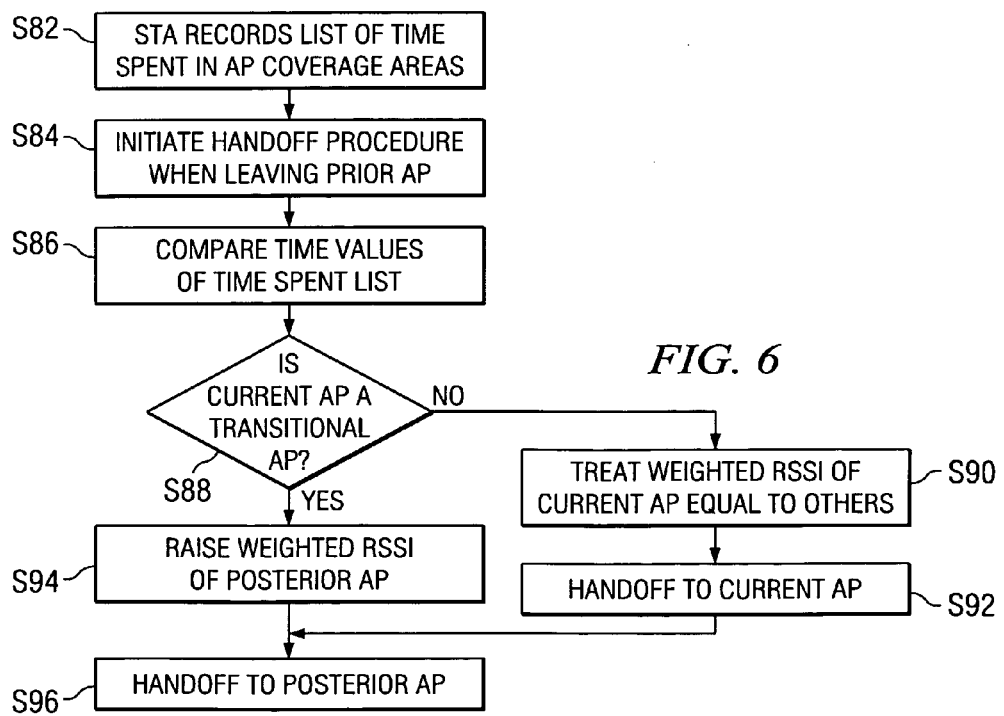
FIG. 6 illustrates a flowchart of an alternative embodiment for reducing the number of handoffs in a wireless local area network.

An alternative embodiment, illustrated in FIG. 6, reduces the number of handoffs that occurs for a STA in an 802.11 WLAN. In this embodiment, each STA keeps a record of the time it has spent (e.g., "TS") in association with the last three APs that it has been connected to, although it is understood that any number of APs may be tracked as potential transitional APs. This could be achieved, for example, by maintaining a list S82 similar to the following: {AP3: TS3, AP2: TS2, AP1: TS1} where AP1 is the AP the STA is currently associated with, AP2 is the prior-associated AP and AP3 is the prior-to-prior associated AP. FIG. 5 illustrates an exemplary topography of AP1, AP2, and AP3 having RF coverage areas defined by overlapping coverage rings 14, 15, and 44, respectively. A user moves STA 16 along traverse path 80 out of AP1's range S84, through AP2's coverage area, to her intended destination at a location 16' inside of AP3's coverage area 44.

When the STA 16 is about to move out of AP1's RF coverage range (e.g., about to perform a handoff from AP1) S84 along traverse path 80, the STA comparesS86 the saved values of TS2 with TS3 and TS1. If (TS2<<TS1) and (TS2<<TS3), this is interpreted to mean that the time spent in the AP2 coverage area 15 is much less than the time the STA spent in both AP3's and AP1's coverage areas. Thus, TS2 shows that AP2 was a transitional AP S88 and the STA could probably have switched from AP1 to AP3 directly, thus saving a handoff. To take advantage of this knowledge, the embodiment uses the concept of weighted-RSSI. During a handoff, there is a site selection algorithm that selects the new AP with which the STA would connect. This algorithm typically uses the RSSI (Received Signal Strength Indicator) to select among the matching-neighboring APs. In the alternative embodiment, instead of using the RSSI, the selection algorithm uses the weighted-RSSI in this procedure. The weights of all APs would be one by default.

In the scenario described above, the weight of AP1 is higher than the weight given to AP2 (the transitional AP). This indicates to the selection algorithm that if the algorithm must choose between AP2 and AP1 in a future handoff, it should give preference to AP1 over AP2. A similar example would give AP3 preference over AP2. Thus, to determine whether the current AP is a transitional AP S88, the algorithm references the RSSI weights of the APs. If the RSSI weights for the two APs is approximately the same S90, then the STA performs a handoff based on the RSSI S92. If the weight of one of the APs is much lower than the other APs, the lower-weighted AP is determined by the algorithm to be a transitional AP, then the weighted RSSI of the posterior A is raised S94 and the STA performs a handoff to the posterior AP S96. A STA would be capable of updating these RSSI weights in an ongoing basis.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for reducing handoff times in an enterprise wireless local area network (WLAN), comprising:
scanning for a plurality of identifying signals from one or more access points in said enterprise wireless local area network (WLAN) with which said wireless station can connect;
memorizing said identifying signals as historical site data;
recording a weighted value for each said access point with said historical site data, wherein each said weighted value represents a successful handoff procedure from a prior access point to a posterior access point;
transmitting, in anticipation of a handoff, a probing signal from a wireless station to a most probable access point to which said wireless station will connect based on said weighted historical site data.

2. The method of claim 1, further comprising:
performing a handoff procedure to said most probable access point if said most probable access point responds to said probing signal; and
updating said historical site data with weights for said prior and said posterior access points.

3. The method of claim 1, wherein said transmitting a probing signal further comprises transmitting probing signals to channels corresponding to a group of most probable access points to which said wireless station will connect based on said weighted historical site data.

4. The method of claim 1, further comprising:
reducing said weighted value in said historical site data if each said access point fails to respond to said probing signal.

5. The method of claim 1, further comprising:
transmitting probing requests to all possible channels of said access points if the difference between the maximum weighted value and the minimum weighted value for said posterior access point is less than a threshold.

6. The method of claim 3, further comprising:
transmitting additional probing signals to at least one additional channel in addition to said probing requests for said channels corresponding to said group; and
updating said historical site data with an identification of a new access point if said new access point is detected after said transmitting additional probing signals.

7. The method of claim 1, wherein if the difference between the two highest weighted values for said prior and said posterior access points is greater than a threshold, then the historical site data is not updated.

8. The method of claim 1, wherein, if said most probable access point fails to respond to said probing signal, transmitting probing signals to all possible channels in said enterprise wireless local network WLAN.

9. The method of claim 1, wherein said scanning comprises scanning in an Institute of Electronic and Electrical Engineers (IEEE) 802.11 network with a wireless Internet Protocol telephone.

10. A method to reduce the number of handoffs that occurs for a wireless station in a wireless network (WLAN), comprising:
using a weighted-RSSI (Received Signal Strength Indicator) from prior-associated access points with a wireless station give preference for a handoff procedure to one of said access points having a most significant weighted-RSS;
recording time spent by a wireless station in prior association with access points in a wireless local area network; and
calculating a weighted-RSSI (Received Signal Strength Indicator) from each said prior-associated access points, wherein a prior-associated access point with greater time spent in association with said station receives a more significant weighted-RSSI.

11. The method of claim 10, further comprising:
beginning a handoff procedure from a first prior-associated access point; receiving beacon signals, onto said station, from a plurality of other prior-plurality associated access points; and comparing said weighted-RSSI for said plurality of access points.

12. The method of claim 10, wherein, said recording comprises recording time spent in matching-neighboring access points within said enterprise wireless local area network WLAN.

13. The method of claim 10, further comprising:
classifying one of said plurality of access points having a least significant weighted-RSSI as a transitional access point; and
giving low preference to said transitional access point during said handoff procedure.

14. The method of claim 10, wherein said recording comprising recording comprises recording time spent by a wireless Internet Protocol telephone in an Institute of Electronic and Electrical Engineers (IEEE) 802.11 network.

* * * * *